United States Patent [19]
Han

[11] Patent Number: 6,035,205
[45] Date of Patent: Mar. 7, 2000

[54] APPARATUS AND METHOD FOR ENHANCING TELEPHONE CALL QUALITY OF FACSIMILE SYSTEM WITH WIRELESS TELEPHONE FUNCTION

[75] Inventor: Eun-Bong Han, Taegukwangyok-shi, Rep. of Korea

[73] Assignee: SamSung Electronics Co., Ltd., Kyungki-do, Rep. of Korea

[21] Appl. No.: 09/036,792

[22] Filed: Mar. 9, 1998

[30] Foreign Application Priority Data

Mar. 7, 1997 [KR] Rep. of Korea ......................... 97-7684

[51] Int. Cl.⁷ ................................................. H04M 11/00
[52] U.S. Cl. ......................... 455/462; 455/426; 455/557; 379/100.01
[58] Field of Search .................................. 455/556, 557, 455/462, 74.1; 379/100.01, 100.02, 100.15, 100.16, 102.04, 106.04, 100.17; 358/400, 401

[56] References Cited

U.S. PATENT DOCUMENTS

| | | | |
|---|---|---|---|
| 4,811,129 | 3/1989 | Mitsuhashi | 360/73.12 |
| 4,881,129 | 11/1989 | Mitsuhasho | 358/439 |
| 4,908,851 | 3/1990 | Kotani et al. | |
| 4,914,716 | 4/1990 | Takahashi | 455/343 |
| 4,914,719 | 4/1990 | Takahashi | 250/339.13 |
| 5,353,329 | 10/1994 | Hayashi | |
| 5,392,023 | 2/1995 | D'Avello et al. | 358/400 |
| 5,479,485 | 12/1995 | Hayashi | 455/462 |
| 5,508,824 | 4/1996 | Baba | 358/468 |
| 5,517,552 | 5/1996 | Yamashita | 455/556 |
| 5,519,506 | 5/1996 | D'Avello et al. | 358/400 |
| 5,574,571 | 11/1996 | Charbonnier | |
| 5,659,401 | 8/1997 | Yoshida | |
| 5,729,667 | 3/1998 | Lee | 358/1.14 |
| 5,758,040 | 5/1998 | Ichimura et al. | 358/442 |
| 5,764,864 | 6/1998 | Sujita | 358/437 |
| 5,894,543 | 4/1999 | Yoshida et al. | 358/437 |

FOREIGN PATENT DOCUMENTS 0 622 883 A2 11/1994 European Pat. Off. ........... H02J 9/06

OTHER PUBLICATIONS

JAPIO Abstract Accession No. 04335913 &JP 0503327613A (SHARP) Oct. 12, 1993.
JAPIO Abstract Accession No. 03890057 & JP 040255157A NIPPON) Oct. 9, 1992.
JAPIO Abstract Accession No. 03812865 & JP 040177965A (NISSAN) Jun. 25, 1992.

*Primary Examiner*—William G. Trost
*Assistant Examiner*—Sonny Trinh
*Attorney, Agent, or Firm*—Robert E. Bushnell, Esq.

[57] ABSTRACT

An apparatus and a method for enhancing a telephone call quality of a facsimile system with a wireless telephone function. The telephone call quality enhancing apparatus comprises a wireless circuit controller operative as a master for controlling the wireless circuit to perform the wireless telephone function, a facsimile circuit controller operative as a slave for controlling the facsimile circuit to perform the facsimile function, and a power switch for supplying power to the facsimile circuit controller and the facsimile circuit under control of the wireless circuit controller only when the facsimile function is performed. The facsimile system with the wireless telephone function according to the present invention has an improved telephone call distance and an enhanced telephone call quality as compared with a conventional facsimile system with a wireless telephone function.

20 Claims, 4 Drawing Sheets

APPARATUS AND METHOD FOR ENHANCING TELEPHONE CALL QUALITY OF FACSIMILE SYSTEM WITH WIRELESS TELEPHONE FUNCTION

CLAIM OF PRIORITY

This application makes reference to, incorporates the same herein, and claims all benefits accruing under 35 U.S.C. § 119 from an application for APPARATUS AND METHOD FOR ENHANCING TELEPHONE CALL QUALITY OF FACSIMILE SYSTEM WITH WIRELESS TELEPHONE FUNCTION earlier filed in the Korean Industrial Property Office on March 7, 1997, and there duly assigned Serial No. 7684/1997, a copy of which is annexed hereto.

BACKGROUND OF THE INVENTION

1. Technical Field

The present invention relates in general to a facsimile system with a wireless telephone function, and more particularly to an apparatus and a method for enhancing a telephone call quality of such a facsimile system, in which power is not supplied to a facsimile circuit when the facsimile circuit is not needed, thereby enhancing the quality of a telephone call which is established by a wireless telephone circuit.

2. Related Art

Conventionally, a facsimile system with a wireless telephone function is composed of a wireless telephone circuit and a facsimile circuit. Such a facsimile system also comprises two controllers which control those two circuits in the performance of their corresponding functions. Conventionally, the controller for the facsimile circuit is a master and the controller for the wireless telephone circuit is a slave.

Two categories of wireless telephone circuits can be utilized in conventional facsimile systems. The first category of wireless telephone circuits includes those which are connected by radio communication to a nearby remote telephone unit and also connected to a telephone line which is, in turn, connected with a central office exchange. Example of the first category are disclosed in U.S. Pat. No. 5,479,485 to Hayashi, for a Facsimile Apparatus Comprising Cordless Telephone Set and U.S. Pat. No. 5,353,329 to Hayashi, for a Facsimile Apparatus And Alarm System With Cordless Telephone Set. The second category of wireless telephone circuits includes those which utilize mobile radiotelephone technology such as that used in cellular telephones. The wireless telephone circuits in the second category are not directly connected to a telephone line. Example of facsimile systems are disclosed in U.S. Pat. No. 5,519,506 to D'Avello et al., for a Data Communication System With Automatic Power Control and U.S. Pat. No. 5,392,023 to D'Avello et al., for a Data Communication System With Automatic Power Control. Other examples of facsimile systems are disclosed in U.S. Pat. No. 4,908,851 to Kotani et al., for a Facsimile Apparatus Operable In Facsimile Or Conversation Mode, No. 5,574,571 to Charbonnier, for a Facsimile Machine With Diverse Communication Facilities and U.S. Pat. No. 5,659,401 to Yoshida, for a Facsimile Apparatus And Method Using Energy Supplied Through A Telephone Line For Operation Thereof A problem exists in the aforementioned conventional facsimile systems. Power is continuously supplied to the facsimile circuit at all times. Thus, power is supplied to the facsimile circuit even when a telephone call is performed using the wireless telephone circuit and no facsimile data is being transmitted or received. As a result of the power being continuously supplied to the facsimile circuit, noise is generated by the controller for the facsimile circuit. This noise is introduced into the wireless telephone circuit and an antenna, resulting in a decreased telephone call distance and a degradation in telephone call quality. In addition, power is wasted because it is supplied to the facsimile circuit when no facsimile data is being transmitted or received.

Accordingly, I have discovered that it would be desirable to enhance the construction of a facsimile system having a wireless telephone function in order to avoid the aforementioned problems.

SUMMARY OF THE INVENTION

It is an object of the present invention to provide an apparatus and a method for enhancing the quality of a telephone call made using a facsimile system having a wireless telephone function, in which power to a facsimile circuit is discontinued, thereby preventing an electromagnetic wave interference and preventing digital noise from being generated in a controller of the facsimile circuit and other circuits, when a telephone call is performed by a wireless telephone circuit.

It is another object of the present invention to provide an apparatus and a method for conserving energy that cuts off power to a facsimile circuit when no facsimile data is being transmitted or received.

In accordance with one aspect of the present invention, there is provided an apparatus for enhancing a telephone call quality of a facsimile system with a wireless telephone function, the facsimile system having a wireless circuit for performing the wireless telephone function and a facsimile circuit for performing a facsimile function, comprising wireless circuit control means operative as a master for controlling the wireless circuit to perform the wireless telephone function, facsimile circuit control means operative as a slave for controlling the facsimile circuit to perform the facsimile function, and power switching means for supplying power to the facsimile circuit control means and the facsimile circuit under control of the wireless circuit control means only when the facsimile function is performed.

In accordance with another aspect of the present invention, there is provided a method for enhancing a telephone call quality of a facsimile system with a wireless telephone function, the facsimile system having a wireless circuit controller operative as a master, a facsimile circuit controller operative as a slave and a power switch for supplying power to the facsimile circuit controller and a facsimile circuit under control of the wireless circuit controller, comprising the first step of controlling the power switch to block the supply of power to the facsimile circuit controller and the facsimile circuit at the normal state, the second step of checking whether a telephone call request is received through a telephone line and, if the telephone call request is received through the telephone line, performing a wireless telephone call mode to make a wireless telephone call of a portable device through a wireless circuit possible, and the third step of checking whether a facsimile reception request through the telephone line is detected or whether a document paper from the user is inserted and, if the facsimile reception request is detected or if the document paper from the user is inserted, controlling the power switch to supply power to the facsimile circuit controller and the facsimile circuit to perform a facsimile call mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
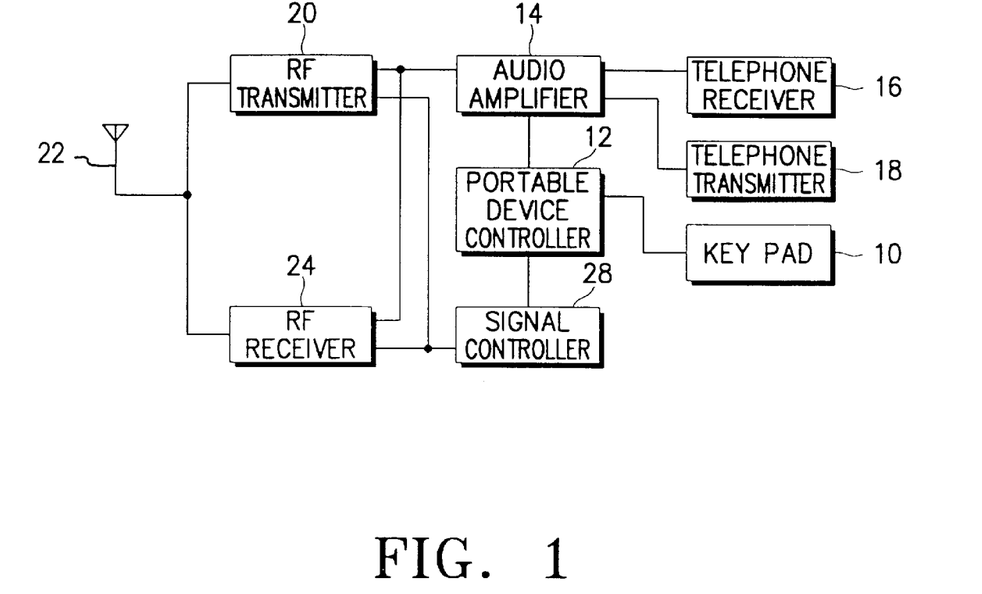
FIG. 1 is a block diagram illustrating a portable device of a facsimile system with a wireless telephone function, according to the principles of the present invention.

Referring now to FIG. 1, which is a block diagram illustrating a portable device of a facsimile system with a wireless telephone function, according to the principles of the present invention, a portable device controller 12 controls the entire operation of the portable device. A key pad 10 outputs key data corresponding to a key pushed by the user to the portable device controller 12. To this end, the key pad 10 includes keys for setting various functions and modes and numeric keys for performing a dialing function. A radio frequency (RF) transmitter 20 transmits a transmission audio signal from an audio amplifier 14 or output data from the portable device controller 12 through an antenna 22 under the control of the portable device controller 12. A radio frequency receiver 24 demodulates a signal received through the antenna 22 and outputs the demodulated signal to the audio amplifier 14. Also, the radio frequency receiver 24 outputs control data to the portable device controller 12. A signal controller 28 controls the radio frequency transmitter 20 and the radio frequency receiver 24, respectively, at transmission and reception frequencies based on control data from the portable device controller 12. The audio amplifier 14 amplifies an audio signal from a telephone transmitter 18, the telephone receiver 16, or the radio frequency receiver 24.

Figure 2:
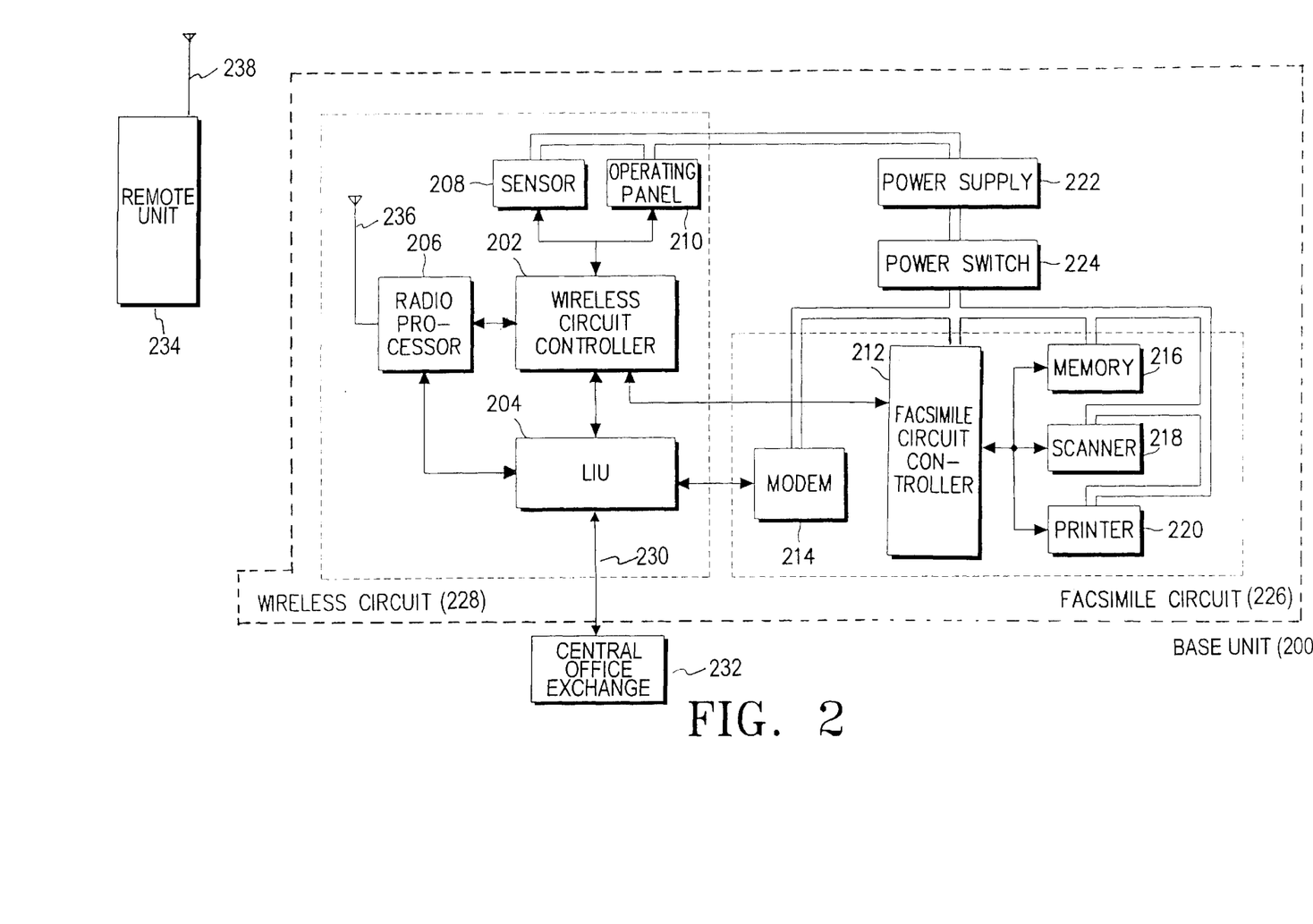
FIG. 2 is a block diagram illustrating a facsimile system with a wireless telephone function, having a base unit and a remote unit, according to the principles of the present invention.

Refer now to FIG. 2, which is a block diagram illustrating a facsimile system with a wireless telephone function, having a base unit and a remote unit, according to the principles of the present invention. The facsimile system comprises a base unit having a wireless circuit and a facsimile circuit. In addition, there is a remote unit connected to the base unit by radio communication. The remote unit is a cordless telephone. A first operator can carry the remote unit away from the base unit and use the remote unit to engage in a conversation with a second operator who is using the base unit. Or the first operator can use the remote unit to engage in a conversation with a caller who is calling via the central office exchange. Or the first operator can use the remote unit to engage in a conversation with the second operator and the caller simultaneously.

In FIG. 2, a base unit 200 includes a wireless circuit 228 and a facsimile circuit 226. The remote unit 234 includes an antenna 238. The wireless circuit 228 includes a wireless circuit controller 202, a line interface unit (LIU) 204, a radio processor 206, a sensor 208, an antenna 236, and an operating panel 210. These components of the wireless circuit are adapted to perform a wireless telephone function under the control of the wireless circuit controller 202. A facsimile circuit 226 includes a facsimile circuit controller 212, a modem 214, a memory 216, a scanner 218 and a printer 220. These components of the facsimile circuit 226 are adapted to perform a facsimile function under the control of the facsimile circuit controller 212. A power supply 222 and a power switch 224 are adapted to supply power to the aforementioned components, not including the remote unit 234. The remote unit 234 can comprise several components not shown such as a power supply, a receiver, a transmitter, an operating panel, and other components. The remote unit 234 is connected to the wireless circuit 228 by radio communication between antenna 238 and antenna 236.

With further reference to FIG. 2, the operating panel 210 comprises various numeric keys and function keys. Also, the operating panel 210 has a display window for displaying a system state and other information thereon. Pushing the keys on the operating panel 210 can cause command signals to be transmitted to the wireless circuit controller 202 to initiate a call for voice communication, to initiate a call for facsimile data transmission, and to perform other functions. The wireless circuit controller 202 is adapted to control the entire operation of the wireless circuit 228. In a preferred embodiment of the present invention, the wireless circuit controller 202 is used as a master controller. Namely, when the facsimile function is performed, the wireless circuit controller 202 generates a control signal to supply power to the facsimile circuit controller 212 and the facsimile circuit 226 to operate them. When the facsimile circuit 226 is not needed, the wireless circuit controller 202 generates a control signal to block power to the facsimile circuit controller 212 and the facsimile circuit 226. The line interface unit 204 selectively switches a telephone line 230 incoming from a central office exchange 232 to a wireless telephone call load and a facsimile call load under the control of the wireless circuit controller 202 to form a call loop.

In FIG. 2, the radio processor 206 includes a radio frequency transmitter for band-modulating a signal switched by the line interface unit 204 under the control of the wireless circuit controller 202 and transmitting the band-modulated signal through the antenna 236, a radio frequency receiver for demodulating a signal received through the antenna 236 into an audio band signal and outputting the demodulated audio band signal to the wireless circuit controller 202, and a signal controller for controlling the radio frequency transmitter and receiver, respectively, at transmission and reception frequencies based on channel data from the wireless circuit controller 202. The remote unit 234 receives the band-modulated signal from the radio processor 206 through the antenna 238. The remote unit 234 transmits a signal through antenna 238 to radio processor 206. The facsimile circuit controller 212 is adapted to control the entire operation of the facsimile circuit 226 according to a control program. In a preferred embodiment of the present invention, the facsimile circuit controller 212 is used as a slave controller. The modem 214 demodulates a modulated signal from the line interface unit 204. Also, the modem 214 modulates a signal to be sent to the telephone line 230 through the line interface unit 204.

With reference to FIG. 2, the memory 216 is composed of a read only memory (ROM) and a random access memory (RAM). The read only memory stores the control program which is executed by the facsimile circuit controller 212. The random access memory stores received or read image data under the control of the facsimile circuit controller 212 when a specific function is performed by the facsimile circuit 226. Also, the random access memory temporarily stores data generated when the facsimile function is performed. The scanner 218 scans a document paper to convert an image thereof into secondary information and outputs the converted information to the facsimile circuit controller 212. The printer 220 prints received or read image data under the control of the facsimile circuit controller 212. The power supply 222 supplies power to the wireless circuit 228 and the power switch 224. The power switch 224 supplies or blocks power to the facsimile circuit controller 212 and the facsimile circuit 226 under the control of the wireless circuit controller 202.

Referring to FIG. 2, the remote unit 234 is a cordless telephone unit which can be picked up by an operator and carried to a location away from the base unit 200 of the facsimile system. The operator can initiate a telephone call using the operating panel 210 of the base unit 200 or the operator can initiate a telephone call using the remote unit 234. The operator can receive a call using the remote unit 234. Or the operator can receive a call using the base unit 200 without use of the remote unit 234. If the operator initiates or receives a telephone call using the remote unit 234, the base unit 200 will be used to connect the remote unit 234 to the central office exchange 232. If the operator initiates or receives a telephone call using the base unit 200, the remote unit 238 is not needed.

With reference to FIG. 2, a first user using the base unit 200 can communicate with a second user using the remote unit 234, even when there is no outside call involving the central office exchange 232. This communication can be described as an internal call. During this internal call involving communication between the first and second users (using the base unit 200 and the remote unit 234, respectively), the power to the facsimile circuit 226 is cut off in order to improve communication quality and to increase the potential distance between the remote unit 234 and the base unit 200. This internal call can be initiated by the first user using the base unit 200 or by the second user using the remote unit 234.

Regarding FIG. 2, the wireless circuit controller 202 which controls the wireless circuit 228 to perform the wireless telephone function is used as the master, and the facsimile circuit controller 212 which controls the facsimile circuit 226 to perform the facsimile function is used as the slave. The power switch 224 supplies power to the facsimile circuit controller 212 and the facsimile circuit 226 under the control of the wireless circuit controller 202 only when the facsimile function is performed.

Figure 3:
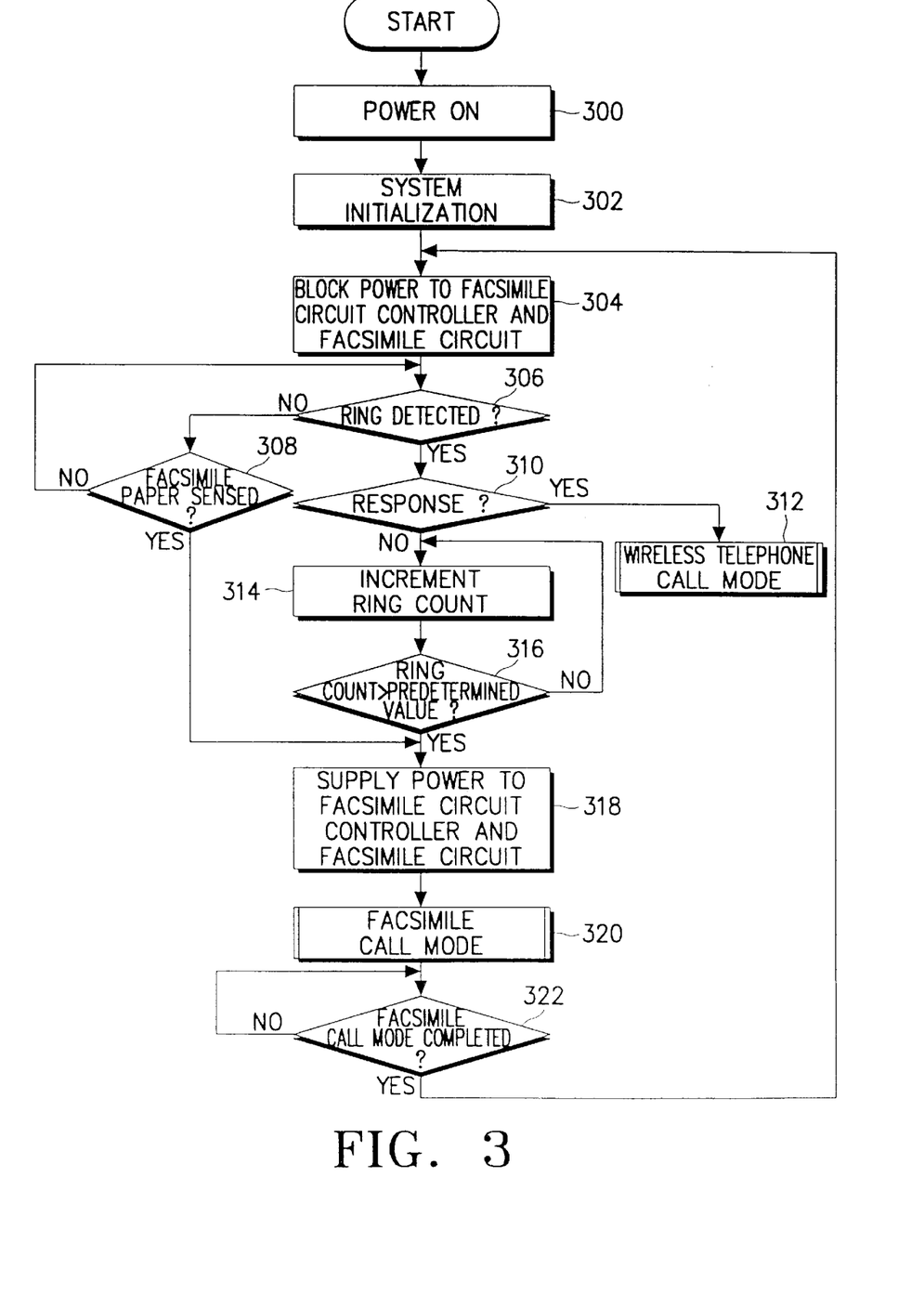
FIG. 3 is a flow diagram illustrating a method for enhancing a telephone call quality of a facsimile system with a wireless telephone function, according to the principles of the present invention.

Refer now to FIG. 3, which is a flow diagram illustrating a method for enhancing a telephone call quality of a facsimile system with a wireless telephone function, according to the principles of the present invention. FIGS. 2 and 3 shall be described together. Note that the wireless circuit controller 202 is a master and the facsimile circuit controller 212 is a slave.

In FIGS. 2 and 3, the wireless circuit controller 202 first turns on power for the facsimile system having a wireless telephone function at step 300 and then initializes that facsimile system at step 302. At step 304, the wireless circuit controller 202 outputs a control signal to the power switch 224 to block a power load from the power supply 222 to the facsimile circuit controller 212 and the facsimile circuit 226. In other words, at step 304 the power switch 224 prevents power from reaching the facsimile circuit 226, according to a control signal transmitted from the wireless circuit controller 202. After step 304, an operator can initiate an outgoing telephone call using the remote unit 234 or the base unit 200, in order to engage in voice communication. Since no power is supplied to the facsimile circuit 226 at this time, the telephone call quality will be improved and the distance between the antenna 238 of the remote unit 234 and the antenna 236 of the base unit 200 can be increased.

With additional reference to FIGS. 2 and 3, the wireless circuit controller 202 performs steps 306 and 308 in turn. In step 306, the wireless circuit controller 202 determines whether an external ring signal is detected. In the embodiment shown in FIG. 2, an external ring signal is detected when a call is received from a caller via the central office exchange 232 and the telephone line 230. The caller may intend to engage in voice communication or may intend to transmit facsimile data or both.

With reference to FIGS. 2 and 3, At step 308, the wireless circuit controller 202 determines whether facsimile paper is sensed. Facsimile paper will be sensed when an operator places a document at a predetermined location on, in, or near the facsimile system shown in FIG. 2. When the operator places the document in the predetermined location, the operator thereby indicates the desire to transmit facsimile data. In other words, facsimile paper is sensed when an operator initiates a process to transmit facsimile data. If the facsimile paper from the operator is sensed by the sensor 208, the following steps occur. First, at step 318, the wireless circuit controller 202 controls the power switch 224 to connect the power load from the power supply 222 to the facsimile circuit controller 212 and the facsimile circuit 226, in order to supply power to the facsimile circuit controller 212 and the facsimile circuit 226. Second, at step 320, the wireless circuit controller 202 controls the facsimile circuit controller 212 in order to enable the facsimile circuit controller 212 to control the facsimile circuit 226. The facsimile circuit 226 then performs the facsimile call mode corresponding to the transmission of facsimile data. Third, at step 322, the wireless circuit controller 202 checks the state of the facsimile circuit 226 to determine whether the facsimile call mode corresponding to the transmission of facsimile data is completed. In the case where the facsimile call mode is not yet completed, the wireless controller 202 performs step 322 again. In the case where the facsimile call mode is completed, the wireless circuit controller 202 returns to step 304 to block the supply of power to the facsimile circuit controller 212 and the facsimile circuit 226.

With further reference to FIGS. 2 and 3, consider the case where, at step 308, no facsimile paper is sensed by the sensor 208. When an external ring signal is detected at step 306, then step 310 is performed. At step 310, the wireless circuit controller 202 determines whether an operator's response is detected. An operator's response to the external ring signal is detected when there exists an off-hook condition. Note that there exists an on-hook condition prior to the operator's response. If the operator's response is detected, the wireless circuit controller 202 switches the line interface unit 204 to a telephone call loop at step 312 to perform a wireless telephone call mode. However, in the case where no operator's response is detected, the wireless circuit controller 202 increments a ring count at step 314 corresponding to each ring, and then compares the incremented ring count with a predetermined value at step 316. If the incremented ring count is greater than or equal to the predetermined value, the wireless circuit controller 202 proceeds to the aforementioned step 318 of controlling the power switch 224 to connect the power load from the power supply 222 to the facsimile circuit controller 212 and the facsimile circuit 226, so as to supply power to the facsimile circuit controller 212 and the facsimile circuit 226. Then, at step 320, the wireless circuit controller 202 controls the facsimile circuit controller 212 in order to enable the facsimile circuit controller 212 to control the facsimile circuit 226. The facsimile circuit 226 then performs the facsimile call mode corresponding to the reception of facsimile data. Next, at step 322, the wireless circuit controller 202 checks the state of the facsimile circuit 226 to determine whether the facsimile call mode corresponding to the reception of facsimile data is completed. In the case where the facsimile call mode is not yet completed, the wireless controller 202 repeats step 322. In the case where the facsimile call mode is completed, the wireless circuit controller 202 returns to step 304 to block the supply of power to the facsimile circuit controller 212 and the facsimile circuit 226.

Figure 4:
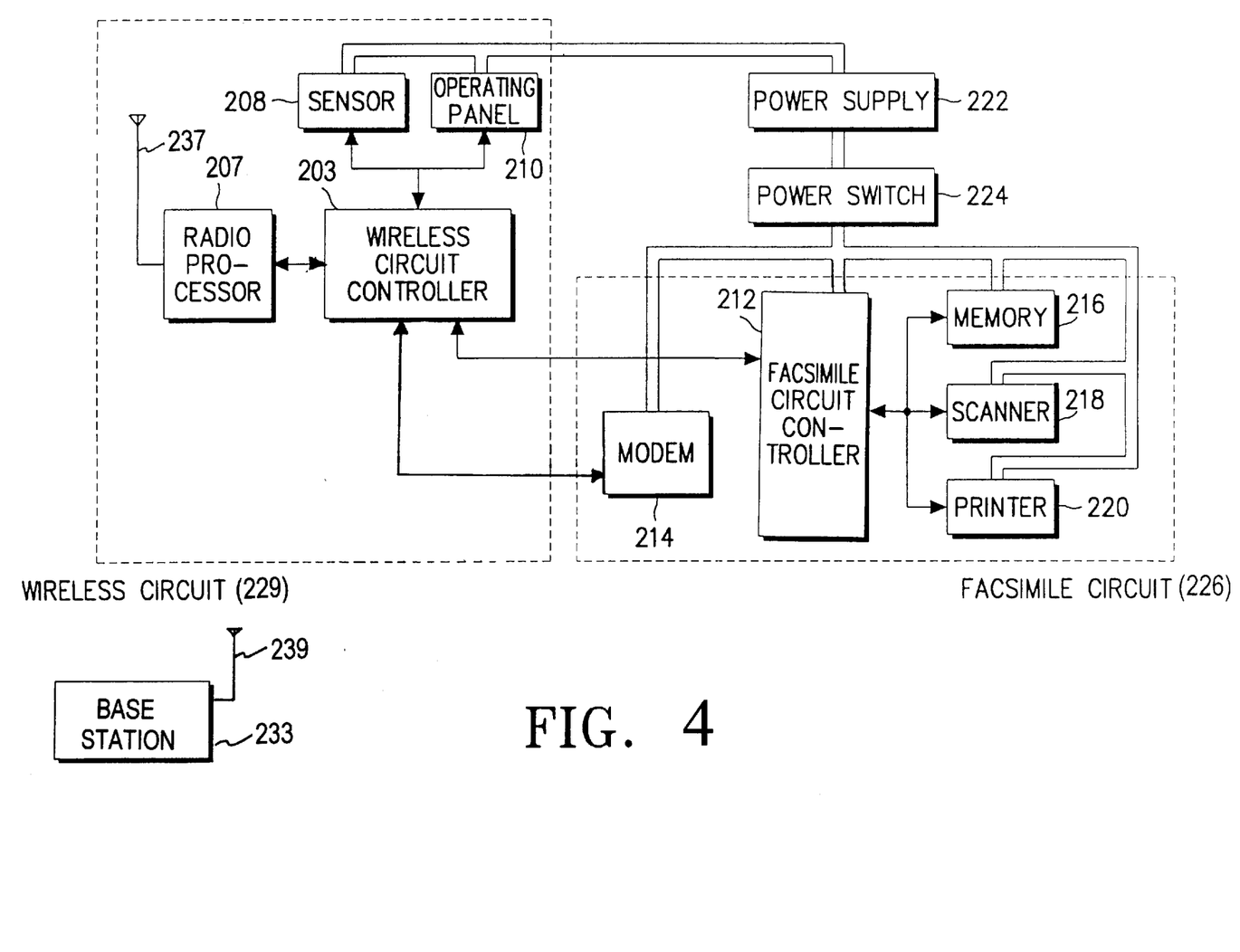
FIG. 4 is a block diagram illustrating a facsimile system with a wireless telephone function, according to the principles of the present invention.

Refer now to FIG. 4, which is a block diagram illustrating a facsimile system with a wireless telephone function, according to the principles of the present invention. The facsimile system comprises a wireless circuit and a facsimile circuit. The facsimile system shown in FIG. 4 utilizes radiotelephone technology such as that implemented in cellular telephones. In this manner, this embodiment of the facsimile system is portable and can be used on a boat, in a car, and in other locations which do not have a telephone line connection to a central office exchange.

In FIG. 4, the facsimile system includes a wireless circuit 229 and a facsimile circuit 226. The wireless circuit 229 includes a wireless circuit controller 203, a radio processor 207, a sensor 208, an antenna 237, and an operating panel 210. These components of the wireless circuit are adapted to perform a wireless telephone function under the control of the wireless circuit controller 202. A facsimile circuit 226 includes a facsimile circuit controller 212, a modem 214, a memory 216, a scanner 218 and a printer 220. These components of the facsimile circuit 226 are adapted to perform a facsimile function under the control of the facsimile circuit controller 212. A power supply 222 and a power switch 224 are adapted to supply power to the aforementioned components.

With further reference to FIG. 4, the operating panel 210 comprises various numeric keys and function keys. Also, the operating panel 210 has a display window for displaying a system state and other information thereon. Pushing the keys on the operating panel 210 can cause command signals to be transmitted to the wireless circuit controller 203 to initiate a call for voice communication, to initiate a call for facsimile data transmission, and to perform other functions. The wireless circuit controller 203 is adapted to control the entire operation of the wireless circuit 229. In a preferred embodiment of the present invention, the wireless circuit controller 203 is used as a master controller. Namely, when the facsimile function is performed, the wireless circuit controller 203 generates a control signal to supply power to the facsimile circuit controller 212 and the facsimile circuit 226 to operate them. When the facsimile circuit 226 is not needed, the wireless circuit controller 203 generates a control signal to block power to the facsimile circuit controller 212 and the facsimile circuit 226. The wireless circuit controller 203 controls incoming calls and selectively directs incoming calls to a wireless telephone call load and a facsimile call load to form a call loop. Calls are received by antenna 237. Calls are transmitted to the facsimile system of FIG. 4 from a base station 233 and antenna 239.

In FIG. 4, the radio processor 207 includes a transmitter under the control of the wireless circuit controller 203 for transmitting a signal through the antenna 237, a receiver for receiving a signal through the antenna 237, and a signal controller for controlling the transmitter and receiver. The radio processor 207 outputs signals corresponding to received signals to the wireless circuit controller 203. The facsimile circuit controller 212 is adapted to control the entire operation of the facsimile circuit 226 according to a control program. In a preferred embodiment of the present invention, the facsimile circuit controller 212 is used as a slave controller. The modem 214 demodulates a modulated signal from the wireless circuit controller 203. Also, the modem 214 modulates a signal to be sent to the base station 233 through the wireless circuit controller 203.

With reference to FIG. 4, the memory 216 is composed of a read only memory (ROM) and a random access memory (RAM). The read only memory stores the control program which is executed by the facsimile circuit controller 212. The random access memory stores received or read image data under the control of the facsimile circuit controller 212 when a specific function is performed by the facsimile circuit 226. Also, the random access memory temporarily stores data generated when the facsimile function is performed. The scanner 218 scans a document paper to convert an image thereof into secondary information and outputs the converted information to the facsimile circuit controller 212. The printer 220 prints received or read image data under the control of the facsimile circuit controller 212. The power supply 222 supplies power to the wireless circuit 229 and the power switch 224. The power switch 224 supplies or blocks power to the facsimile circuit controller 212 and the facsimile circuit 226 under the control of the wireless circuit controller 203.

Referring to FIG. 4, the operator can initiate and receive a telephone call using the facsimile system. The wireless circuit controller 203 which controls the wireless circuit 229 to perform the wireless telephone function is used as the master, and the facsimile circuit controller 212 which controls the facsimile circuit 226 to perform the facsimile function is used as the slave. The power switch 224 supplies power to the facsimile circuit controller 212 and the facsimile circuit 226 under the control of the wireless circuit controller 203 only when the facsimile function is performed. In this manner, when a telephone call is transmitted or received for voice communication, the power to the facsimile circuit 226 is cut off. Because power is cut off to the facsimile circuit when the facsimile circuit is not needed, the distance between antenna 239 of base station 233 can be increased. Also, the telephone call quality can be improved.

As apparent from the above description, according to the principles of the present invention, the wireless circuit controller is used as the master and the facsimile circuit controller is used as the slave, so that power can be supplied to the facsimile circuit controller and the facsimile circuit under the control of the wireless circuit controller only when the facsimile function is performed. Therefore, the facsimile system with the wireless telephone function according to the principles of the present invention has a longer telephone call distance and an enhanced telephone call quality as compared with the conventional facsimile system with a wireless telephone function.

Another embodiment of the facsimile system with a wireless telephone function according to the principles of the present invention has radiotelephone technology such as that implemented in cellular telephones, has a connection to a central office exchange via a telephone line, and has a remote unit. FIG. 2 can be used to describe this embodiment, where antenna 236 has a dual purpose such that it can be used for cellular calls directly to a base station (not shown) and can be used to provide communication between the base unit and the remote unit. In this manner, the facsimile system is portable and can be used on a boat, in a car, and in other locations which do not have a telephone line connection to a central office exchange. Also, the facsimile system can be used at locations such as offices which do have a telephone line connection to a central office exchange. Use of a telephone line connection is usually less expensive than use of a cellular telephone connection.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile apparatus having a wireless call capability, able to reduce undesirable electromagnetic interference in aural signals during wireless telephone calls, thereby improving wireless telephone call quality and increasing wireless telephone call distance, comprising:

a first control unit controlling a facsimile apparatus, outputting a first power control signal in response to image signals, outputting a second power control signal in response to aural signals, receiving a sensing signal, and receiving a command signal;

a transceiver unit coupled to said first control unit, transmitting and receiving aural and image signals via airwaves;

a line interface unit coupled to said first control unit and said transceiver unit, receiving and transmitting aural and image signals from and to a central office exchange via a cable, and receiving and transmitting aural and image signals from and to said transceiver unit;

a power supply unit outputting a first power to said first control unit and outputting a second power;

a sensor coupled to said first control unit, sensing an original document having a surface containing image data, receiving the first power from said power supply unit, and transmitting the sensing signal to said first control unit in response to the sensing of the original document;

an operating panel coupled to said first control unit comprising a plurality of keys for entering numeric digits and commands, receiving the first power from said power supply unit, and transmitting the command signal to said first control unit;

a switch unit receiving the second power from said power supply unit, receiving the first and second power control signals from said first control unit, outputting the second power in response to the first power control signal corresponding to image signals transmitted and received, and stopping output of the second power in response to the second power control signal corresponding to aural signals transmitted and received;

a modulator/demodulator unit coupled to said line interface unit, modulating and demodulating image signals, selectively receiving the second power from said switch unit according to the first and second power control signals, and receiving and transmitting image signals;

a scanner reading image data from the original document, transmitting image signals corresponding to read image data, and selectively receiving the second power from said switch unit according to the first and second power control signals;

a memory storing image signals received from said scanner, and selectively receiving the second power from said switch unit according to the first and second power control signals;

a printer receiving image signals, recording image data on a recordable medium corresponding to received image signals, and selectively receiving the second power from said switch unit according to the first and second power control signals; and a second control unit coupled to said first control unit, scanner, memory, and printer, selectively receiving the second power from said switch unit according to the first and second power control signals, and controlling said scanner, memory, and printer.

2. The facsimile apparatus of claim 1, wherein said transceiver unit comprises an antenna for transmitting and receiving aural and image signals via airwaves.

3. The facsimile apparatus of claim 1, further comprising a portable unit receiving and transmitting aural signals from and to said transceiver unit via airwaves.

4. The facsimile apparatus of claim 3, wherein said portable unit comprises:

a second power supply supplying power to said portable unit;

a second operating panel comprising a second plurality of keys for entering numeric digits and commands;

a second transceiver unit for transmitting and receiving aural signals; and a second antenna for transmitting and receiving aural signals via airwaves.

5. The facsimile apparatus of claim 1, wherein said operating panel further comprises a video display conveying varying visual information to a user.

6. The facsimile apparatus of claim 1, wherein said memory comprises a read-only memory storing a control program executed by said second control unit, and a random access memory storing image signals from said scanner.

7. A facsimile apparatus having a wireless call capability, able to reduce undesirable electromagnetic interference in aural signals during wireless telephone calls, thereby improving wireless telephone call quality and increasing wireless telephone call distance, comprising:

a first control unit controlling a facsimile apparatus, outputting a first power control signal in response to image signals, outputting a second power control signal in response to aural signals, receiving a sensing signal, and receiving a command signal;

a transceiver unit coupled to said first control unit, transmitting and receiving aural and image signals via airwaves;

a power supply unit outputting a first power to said first control unit and outputting a second power;

a sensor coupled to said first control unit, sensing an original document having a surface containing image data, receiving the first power from said power supply unit, and transmitting the sensing signal to said first control unit in response to the sensing of the original document;

an operating panel coupled to said first control unit comprising a plurality of keys for entering numeric digits and commands, receiving the first power from said power supply unit, and transmitting the command signal to said first control unit;

a switch unit receiving the second power from said power supply unit, receiving the first and second power control signals from said first control unit, outputting the second power in response to the first power control signal corresponding to image signals transmitted and received, and stopping output of the second power in response to the second power control signal corresponding to aural signals transmitted and received;

a modulator/demodulator unit coupled to said first control unit, modulating and demodulating image signals received from said first control unit, selectively receiving the second power from said switch unit according to the first and second power control signals, and transmitting image signals to said first control unit;

a scanner reading image data from the original document, transmitting image signals corresponding to read image data, and selectively receiving the second power from said switch unit according to the first and second power control signals;

a memory storing image signals received from said scanner, storing image signals received from said first control unit, and selectively receiving the second power from said switch unit according to the first and second power control signals;

a printer receiving image signals from said first control unit, recording image data on a recordable medium corresponding to image signals received from said first control unit, and selectively receiving the second power from said switch unit according to the first and second power control signals; and a second control unit coupled to said first control unit, scanner, memory, and printer, selectively receiving the second power from said switch unit according to the first and second power control signals, and controlling said scanner, memory, and printer.

8. The facsimile apparatus of claim 7, wherein said transceiver unit comprises an antenna for transmitting and receiving aural and image signals via airwaves.

9. The facsimile apparatus of claim 7, wherein said operating panel further comprises a first video display conveying varying visual information to a user.

10. The facsimile apparatus of claim 7, wherein said memory comprises a read-only memory storing a control program executed by said second control unit, and a random access memory storing image signals from said scanner.

11. A method for reducing undesirable electromagnetic interference in aural signals during wireless telephone calls in a facsimile apparatus having a wireless call capability, thereby improving wireless telephone call quality and increasing wireless telephone call distance, comprising the steps of:

supplying power from a power supply to a first control unit of a facsimile apparatus and a power switch, enabling operation of said first control unit;

transmitting a block signal from said first control unit to said power switch, preventing power from being supplied to a second control unit, stopping operation of said second control unit, and preventing undesirable electromagnetic interference in transmitted and received aural signals;

determining when a ring signal is detected, for identifying when said facsimile apparatus receives a call;

when the ring signal is not detected and an original document having a surface containing image data is detected, initiating an image signal mode for transmission of image signals, stopping transmission of the power block signal from said first control unit to said power switch, supplying power to said second control unit from said power switch enabling operation of said second control unit, transmitting the image data contained on the original document, detecting completion of transmission of the image data, and, when completion of transmission of the image data is detected, transmitting the block signal from said first control unit to said power switch, preventing power from being supplied to said second control unit, stopping operation of said second control unit, and preventing undesirable electromagnetic interference in transmitted and received aural signals;

when said ring signal is detected, determining when an off-hook condition exists indicating a response by a user;

incrementing a ring signal count when each ring signal is detected;

when the off-hook condition exists prior to the detection of a predetermined number of ring signals, initiating an aural signal mode for transmission and reception of aural signals; and when the off-hook condition does not exist prior to the detection of the predetermined number of ring signals, initiating an image signal mode for reception of image signals, stopping transmission of the power block signal from said first control unit to said power switch, supplying power to said second control unit from said power switch enabling operation of said second control unit, receiving image data, detecting completion of reception of image data, and, when completion of reception of image data is detected, transmitting the block signal from said first control unit to said power switch, preventing power from being supplied to said second control unit, stopping operation of said second control unit, and preventing undesirable electromagnetic interference in transmitted and received aural signals.

12. The method of claim 11, wherein said second control unit comprises a modulator/demodulator unit coupled to said first control unit, modulating and demodulating image signals, and transmitting and receiving image signals.

13. The method of claim 11, wherein said second control unit comprises a scanner reading image data from the original document, transmitting image signals corresponding to read image data.

14. The method of claim 11, wherein said second control unit comprises a memory storing image signals received from said scanner.

15. The method of claim 11, wherein said second control unit comprises a printer receiving image signals, recording image data on a recordable medium corresponding to received image signals.

16. The method of claim 11, wherein said second control unit comprises a control circuit controlling transmission and reception of image signals.

17. The method of claim 11, wherein said first control unit comprises a control circuit controlling transmission and reception of image and aural signals, and controls supply of power to said second control unit.

18. The method of claim 1, wherein said first control unit comprises a transceiver unit transmitting and receiving image and aural signals.

19. The method of claim 11, wherein said first control unit comprises a sensor detecting the original document having the surface containing image data.

20. The method of claim 11, wherein said first control unit comprises an operating panel having a plurality of keys for entering numeric digits and commands.

* * * * *